(12) United States Patent
Urakawa et al.

(10) Patent No.: US 7,697,653 B2
(45) Date of Patent: Apr. 13, 2010

(54) MOBILE STATION AND OUTPUT CONTROL METHOD

(75) Inventors: Yasutaka Urakawa, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 749 days.

(21) Appl. No.: 11/087,341

(22) Filed: Mar. 22, 2005

(65) Prior Publication Data
US 2005/0215240 A1  Sep. 29, 2005

(30) Foreign Application Priority Data
Mar. 23, 2004  (JP)  ............................ P2004-085380

(51) Int. Cl.
*H04L 23/00* (2006.01)
(52) U.S. Cl. ........................................ 375/377; 725/28
(58) Field of Classification Search ................. 375/219, 375/220, 256, 295, 316, 326, 354, 377; 455/3.01, 455/414.1, 418, 420, 426.1, 456.1, 73, 550.1, 455/566; 725/25–31
See application file for complete search history.

(56) References Cited

U.S. PATENT DOCUMENTS

| 5,550,575 | A  | * | 8/1996  | West et al. ...................... 725/28 |
| 5,828,402 | A  | * | 10/1998 | Collings ........................ 725/28 |
| 6,005,598 | A  | * | 12/1999 | Jeong .......................... 725/28 |
| 6,020,882 | A  | * | 2/2000  | Kinghorn et al. ............. 715/716 |
| 6,449,766 | B1 | * | 9/2002  | Fleming ........................ 725/28 |
| 6,567,979 | B1 | * | 5/2003  | deCarmo ...................... 725/25 |
| 7,506,055 | B2 | * | 3/2009  | McClain et al. .............. 709/225 |
| 2002/0124252 | A1 | * | 9/2002  | Schaefer et al. ................ 725/33 |
| 2002/0184642 | A1 | * | 12/2002 | Lude et al. ................... 725/105 |
| 2003/0008662 | A1 | * | 1/2003  | Stern et al. ................... 455/456 |
| 2003/0021244 | A1 | * | 1/2003  | Anderson .................... 370/329 |
| 2003/0120817 | A1 |   | 6/2003  | Ott et al. |
| 2003/0125033 | A1 | * | 7/2003  | Rindsberg et al. ........... 455/450 |
| 2005/0028208 | A1 | * | 2/2005  | Ellis et al. ....................... 725/58 |
| 2006/0020959 | A1 | * | 1/2006  | Masuda ........................ 725/25 |
| 2006/0218574 | A1 | * | 9/2006  | Van Horck .................... 725/25 |

FOREIGN PATENT DOCUMENTS

| JP | 10-275157    | 10/1998 |
| JP | 11-045285    | 2/1999  |
| JP | 2002-544582  | 12/2002 |
| JP | 2003-044441 A | 2/2003 |
| WO | WO 98/43177  | 10/1998 |
| WO | WO 00/68764  | 11/2000 |
| WO | WO 01/59612  | 8/2001  |

OTHER PUBLICATIONS

Japanese Office Action w/ English translation dated May 20, 2008.
Office Action issued Jun. 8, 2007 in Chinese Patent Application No. 200510054881.6 (with translation).
Paul Resnick, "PICS, Censorship, & Intellectual Freedom FAQ" [Online] Aug. 4, 1999.

* cited by examiner

*Primary Examiner*—Jean B Corrielus
(74) *Attorney, Agent, or Firm*—Brinks Hofer Gilson & Lione

(57) ABSTRACT

A mobile station is configured to acquire at least one of country information and carrier in formation as output control information. The mobile station is also configured to receive download data that includes harmful level information. The mobile station includes a predetermined rule for determining whether output of the data is to be permitted based on the harmful level information and the output control information.

18 Claims, 4 Drawing Sheets

Fig. 2

| NUDE | JAPAN | USA | COUNTRY 3 |
|---|---|---|---|
| 0 NONE | 0 PERMITTED | 0 PERMITTED | 0 PERMITTED |
| 1 SCANTY OUTFITS | 0 PERMITTED | 0 PERMITTED | 1 PROHIBITED |
| 2 PARTIAL NUDE | 0 PERMITTED | 1 PROHIBITED | 1 PROHIBITED |
| 3 COMPLETE NUDITY | 1 PROHIBITED | 1 PROHIBITED | 1 PROHIBITED |
| 4 PROVOCATIVE COMPLETE NUDITY | 1 PROHIBITED | 1 PROHIBITED | 1 PROHIBITED |

Fig.4

| VIOLENCE | NUDE |
|---|---|
| 0 LIMIT ALL VIOLENCE | 0 NONE |
| 1 STRUGGLE | 1 SCANTY OUTFITS |
| 2 KILLING | 2 PARTIAL NUDE |
| 3 BLOODY MURDER | 3 COMPLETE NUDITY |
| 4 BRUTAL AND EXTREME VIOLENCE | 4 PROVOCATIVE COMPLETE NUDITY |

MOBILE STATION AND OUTPUT CONTROL METHOD

BACKGROUND OF THE INVENTION

1. Field of the Invention

The present invention relates to a mobile station with an output function of data, and an output control method in the mobile station.

2. Related Background Art

Presently, quite a lot of contents browsable on the Internet include contents offensive to public order and decency. One of methods of controlling display of such contents is the method by the Platform for Internet Content Selection of W3C (World Wide Web Consortium). In this method, for example, a content creator sets harmful level information on a content created thereby, based on harmful levels as shown in the table of FIG. 4. Specific setting methods thereof include, for example, a method of defining and setting a label or labels such as the "PICS-Labels" on each web page (e.g., reference is made to Japanese Patent Application Laid-Open No. 2003-44441).

SUMMARY OF THE INVENTION

However, the above-mentioned rule is the standard code, and display restrictions based on the harmful levels differ depending upon practices and regulations in respective countries. Therefore, the control of display should not be uniform, but needs to be performed in accordance with practices and others on a country-by-country basis. On the other hand, thanks to the techniques of international roaming and others, it is often the case that an identical device of a mobile station is used across the world, and the mobile stations are also used by young people. Therefore, it is becoming necessary, particularly, to perform the display control according to each country and individual circumstances in the mobile stations.

An object of the present invention is therefore to provide a mobile station and an output control method capable of more adequately performing output control in the mobile station according to each country and individual circumstances.

In order to achieve the above-mentioned object, a mobile station according to the present invention is a mobile station with an output function of data comprising: output control information acquiring means for acquiring at least one of country information and carrier information as output control information; harmful level acquiring means for acquiring harmful level information included in the data; output control rule holding means for holding a predetermined rule for determining whether output of the data is to be permitted, based on the harmful level information and the output control information; and output controlling means for making a determination on whether the output of the data is to be permitted, based on the output control information acquired by the output control information acquiring means and the harmful level information acquired by the harmful level acquiring means, in the light of the rule held by the output control holding means, and for performing a control of the output of the data on the basis of a result of the determination.

Here the above-mentioned data encompasses character data, image data, video data, voice data, and so on. The country information is, for example, information for specifying nationality of a user of the mobile station or a country where the mobile station is used, i.e., a country as a basis of the output control. The carrier information is information for specifying a company or the like which provides a telecommunications service received by the mobile station.

In the mobile station according to the present invention, the output control of the data is carried out based on the output control information and harmful level information acquired, in the light of the predetermined rule. Therefore, if the predetermined rule is coordinated with each country or individual circumstances, the output control can be more adequately performed in the mobile station in accordance with each country and individual circumstances.

Preferably, the mobile station further comprises reading means for reading information from an external recording medium, and the output control information acquiring means acquires at least one of the country information and the carrier information from the information read by the reading means. A mode for the reading means to read the information from the external recording medium is, for example, to read information from an IC card or the like inserted at a predetermined position in the mobile station.

In the above-mentioned configuration, the output control can be performed using the information included in the external recording medium. This permits the output control to be more adequately carried out using the card or the like which has been and is used for identification of the user of the mobile station or the like.

In the mobile station, preferably, the output control information acquiring means acquires country information, based on information acquired by a communication function of the mobile station, or based on location information of the mobile station measured by use of GPS (Global Positioning System).

The above-mentioned configuration permits the output control to be performed using the location information or the like that can be readily acquired as before in the mobile station, whereby the output control per country can be more adequately performed.

In the mobile station, preferably, the output control information acquiring means acquires the carrier information, based on information acquired by a communication function of the mobile station.

In the above-mentioned configuration, for example, where bases of restrictions on the data output are different among carriers, the output control can be performed using the carrier information that can be readily acquired as before in the mobile station, whereby the output control per carrier can be more adequately carried out.

In the mobile station, preferably, in a case where the output control information acquiring means acquires a plurality of output control information items, when the output controlling means determines in the light of the predetermined rule that the output of the data according to the harmful level information is permitted about all the output control information items, the output controlling means determines that the output of the data is to be permitted. This enables implementation of more adequate data output control while following the rule compatible with all the output control information items.

The present invention can also be understood as the information according to the output control method as described below, with like action and effect.

An output control method according to the present invention is an output control method in a mobile station provided with an output function of data and holding a predetermined rule for determining whether output of the data is to be permitted, based on harmful level information included in the data and output control information, the method comprising: an output control information acquiring step of acquiring at least one of country information and carrier information as the output control information; a harmful level acquiring step of acquiring harmful level information included in the data; and an output controlling step of making a determination on whether the output of the data is to be permitted, based on the output control information acquired in the output control information acquiring step and the harmful level information acquired in the harmful level acquiring step, in the light of the rule held in the mobile station, and performing a control of the output of the data on the basis of a result of the determination.

According to the present invention, as described above, the output control of information is performed based on the output control information acquired, in the light of the predetermined rule, and by coordinating the predetermined rule with each country and individual circumstances, it becomes feasible to more adequately perform the output control in the mobile station in accordance with each country and individual circumstances.

BRIEF DESCRIPTION OF THE DRAWINGS

FIG. 2 is a table for holding a predetermined rule in an output control rule holder.

FIG. 4 is an example of a table of harmful levels set for contents.

DESCRIPTION OF THE PREFERRED EMBODIMENTS

Embodiments of the present invention will be described below with reference to the drawings.

Figure 1:
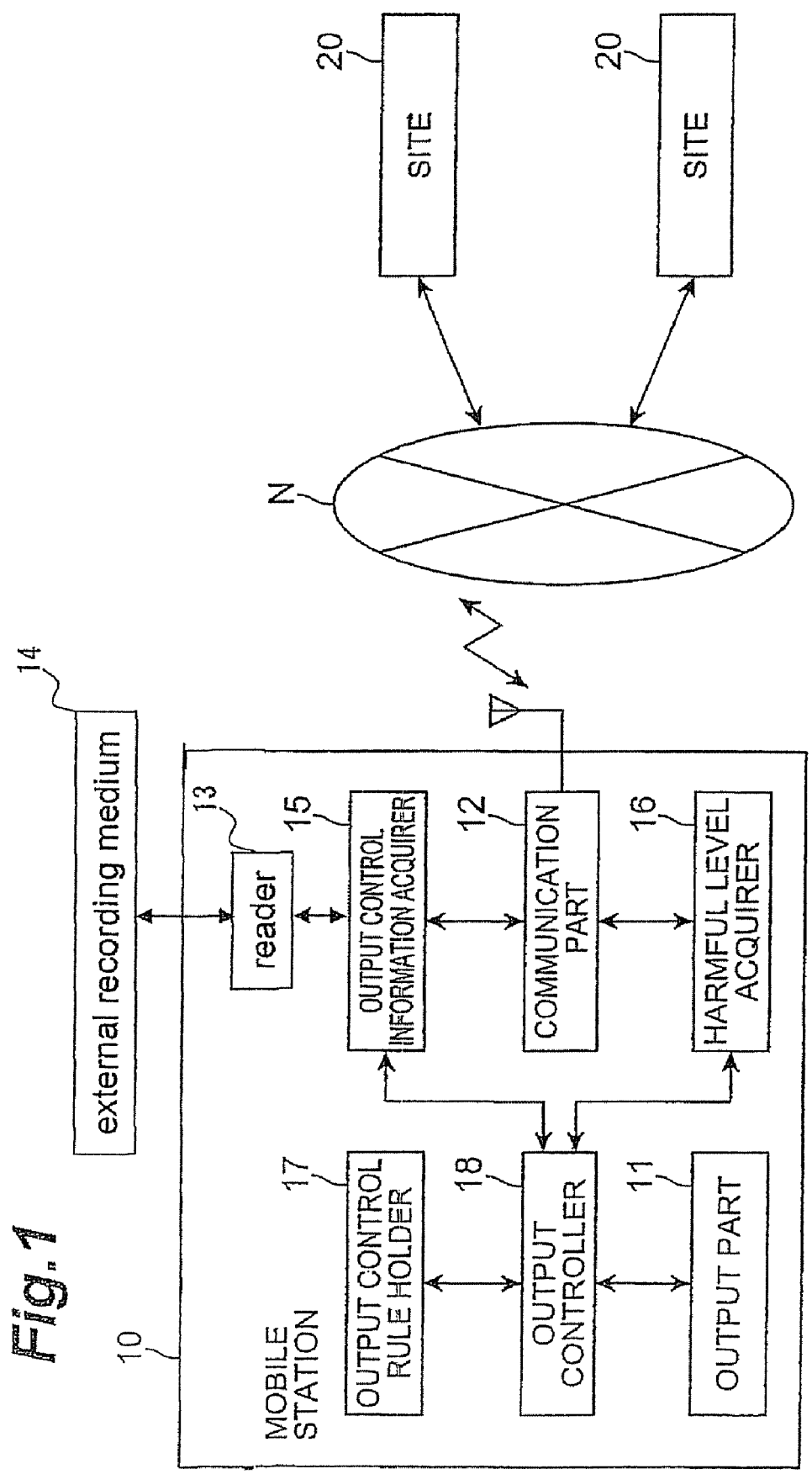
FIG. 1 is a configuration diagram of a mobile station according to an embodiment of the present invention.

FIG. 1 shows a configuration of mobile station 10 according to the present embodiment. The mobile station 10 is connectible to a network N and is preferably configured to be able to access site 20 through the network N and to download data available for output in the mobile station 10, from site 20. Here the mobile station 10 specifically corresponds, for example, to mobile communication equipment or the like such as a cell phone. The sites 20 specifically correspond, for example, to Web servers and others for providing various contents. The network N specifically corresponds, for example, to a mobile communication network, an Internet network, or the like. The output stated herein is specifically, for example, one preferably recognized by vision or audition of the user, such as display of character data or image data, reproduction of video data or voice data, and so on.

Components of the mobile station 10 will be described below. The mobile station 10 is composed of an output part 11, a communication part 12, an output control information acquirer 15, a harmful level acquirer 16, an output control rule holder 17, and an output controller 18.

The output part 11 outputs data acquired by the mobile station 10 or held in the mobile station 10. Specifically, for example, the output part 11 corresponds to a display device for character data, image data, and video data, and corresponds to a speaker or the like for voice data.

The communication part 12 performs connection and communication with the network N. This communication part 12 performs downloading of data and acquisition of data about communication. This communication is preferably wireless communication.

The output control information acquirer 15 acquires at least one of country information and carrier information as output control information to be used for control of output of data. Specific acquiring methods thereof will be described later.

Here the country information is, for example, information for specifying nationality of the user of the mobile station 10 or a country where the mobile station 10 is used, and information for specifying a country as a basis of the output control. A reason why the country information is used as output control information is that the contents to be restricted are different among countries because of differences in regulations, practices, religions, and so on. Specifically, it is because the output control is to be carried out based on differences of restrictions, for example, less restrictions on sex expression in the Western countries than in Muslim-dominated countries. The country information is preferably given by use of country names, country codes for international calls, or the like.

The carrier information is information for specifying a company or the like which provides a communication service received by the mobile station 10. A reason why the carrier information is used as output control information is that bases of restrictions on data output are sometimes different among carriers.

The harmful level acquirer 16 reads data downloaded by the communication part 12, or data preliminarily held in the mobile station 10, to acquire harmful level information included in the data. The harmful level information is information indicating the degree of harmfulness of data categorized by contents, for example, as defined in the table shown in FIG. 4. Specifically, for example, where the data is data to display "bloody murder", the harmful level information is set at "3" in the "violence" category. In this manner, the harmful level information is preferably indicated by use of numbers increasing with increase in the degree of harmfulness. This harmful level information is included in the data in principle by a data creator. Alternatively, it may be arranged to be automatically included in the data in accordance with a certain rule.

The output control rule holder 17 holds a rule for making a determination on whether output of data is to be permitted, based on the harmful level information and the output control information. The rule is held in the form of a table, for example, as shown in FIG. 2. Specifically, for example, as shown in FIG. 2, the propriety of display is set for each country and for each harmful level as to data containing the harmful level information of "nude" category. For example, data with the harmful level information of "2" is set "displayable" according to criteria of "Japan", whereas it is set "undisplayable" according to criteria of "the United States". This rule may be preliminarily set in the mobile station 10 in accordance with the criteria and others based on laws and regulations per country. In addition, the rule may also be set by the user of the mobile station 10, with consideration to such cases as a parent wants to impose restrictions on output to a child.

The output controller 18 retrieves the output control information acquired by the output control information acquirer 15, the harmful level information acquired by the harmful level acquirer 16, and the rule held in the output control rule holder 17, makes a determination on whether output of data is to be permitted, based on these information, in the light of the rule, and performs a control of output of the data to the output part 11 on the basis of a result of the determination.

Figure 3:
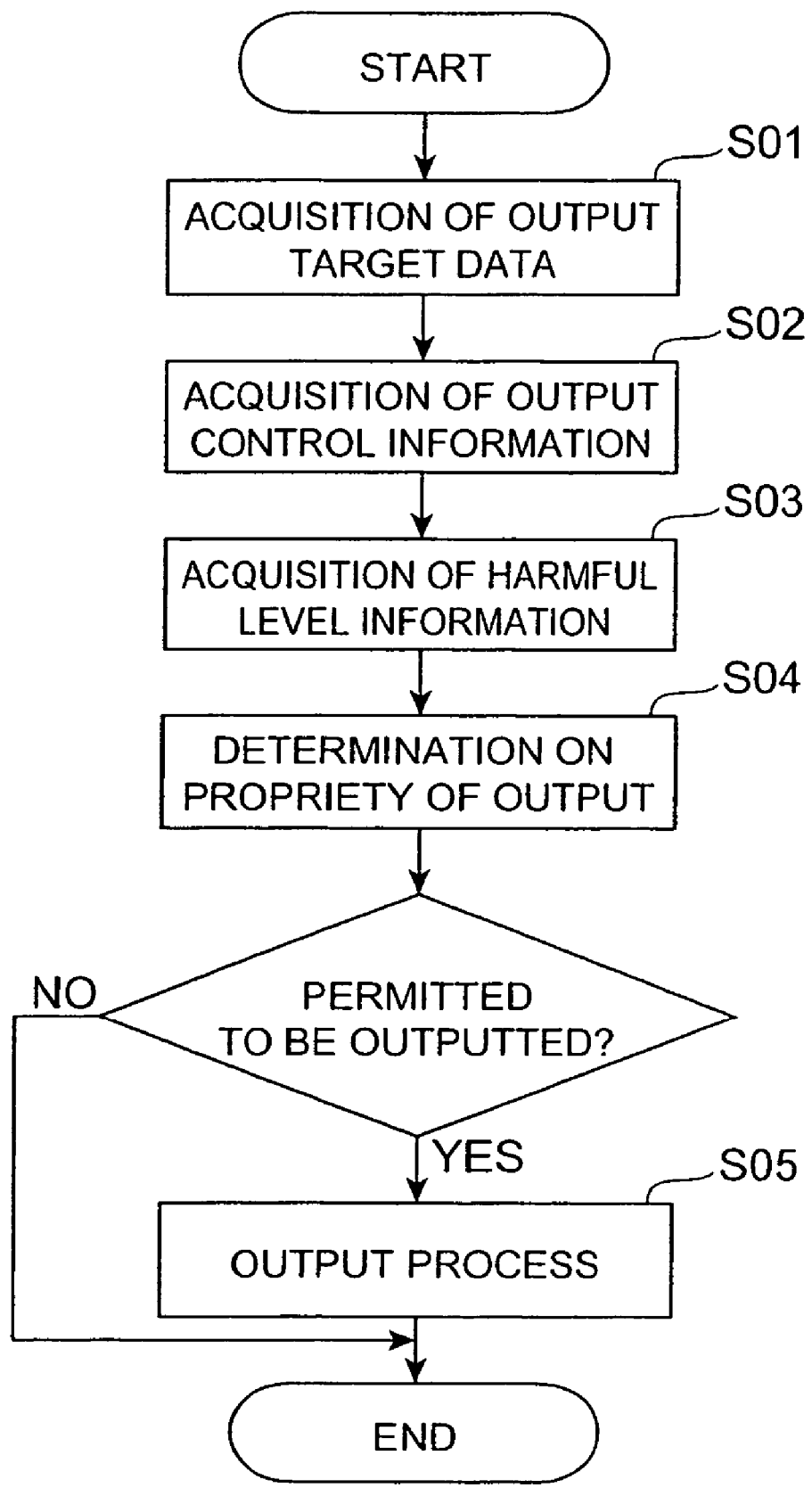
FIG. 3 is a flowchart of processing of a mobile station in an embodiment.

Next, the processing executed by the mobile station 10, and the effect in the present embodiment will be described using the flowchart of FIG. 3.

It is assumed in the present embodiment that data is acquired, for example, by downloading from site 20 and the processing is carried out on the occasion of displaying the data. In the mobile station 10, first, the communication part 12 accesses a site 20 through the network N and acquires data as a target for output by downloading of the data in accordance with an operation or the like by the user of the mobile station 10 (S01).

Subsequently, the output control information acquirer 15 acquires the output control information (S02). Specifically, the acquisition of the output control information is preferably carried out as follows. Examples of the output control information include country information and carrier information, and methods of acquiring the country information are as follows.

UIM (User Identity Module) is an IC card containing a record of subscriber information, which is used in cell phones and others. A potential method is to acquire the country information from information (e.g., telecommunications carrier information) included in the subscriber information of this UIM. In that case, the information included in the UIM is read by a reader 13 for reading the UIM. The UIM being an external recording medium 14 set in the mobile station 10, and the country is specified from the information. The country information acquired in this manner is regarded as nationality of the subscriber and the criteria for output restrictions in that country are applied. Then, for example, where the criteria in a home country must be observed because of religious disciplines or the like, the rules in the home country can be applied even outside the country. On the grounds that the information specified by the above-mentioned means can be different from the nationality of the subscriber, the mobile station 10 may be further provided with a means for performing correction or the like of the country information acquired. The mobile station 10 may also be provided with a means capable of preliminarily setting and changing the nationality of the owner.

The mobile station 10 may also be arranged to specify the country where the mobile station 10 is located, based on location information of the mobile station 10 included in broadcast information that can be acquired in communication with a base station in the network N, and it may be used as the country information. The country information may also be obtained based on location information of the mobile station 10 measured by use of GPS or location information provided by a carrier service. Furthermore, the country information may also be obtained from telecommunications company information of a roaming service provider or the like. Where the mobile station 10 is configured so that it acquires the location thereof and applies the criteria for output restrictions in a country including the location as described above, it is feasible to prevent violation of laws and regulations, for example, even if the user is unaware of the laws and regulations in that country.

Preferred methods of acquiring the carrier information include the method by UIM, the method by broadcast information, etc. as in the case of the acquisition of the country information described above. When the criteria for output restrictions by the carrier are applied, a safer self-restraint rule can be applied than the country-based restrictions, because the carrier is very familiar with the circumstances and contents in the country.

Subsequently, the harmful level acquirer 16 reads the data downloaded by the communication part 12 to acquire the harmful level information included in that data (S03). Where the data contains no harmful level information, i.e., where no harmful level is set by a creator of that data, the mobile station 10 may be arranged not to perform output of the data.

Subsequently, the output controller 18 retrieves the output control information and the harmful level information acquired and the rule held in the output control rule holder 17, and makes a determination on whether output of the data is to be permitted, based on these information and rule (S04). Specifically, in a case where the country information as the output control information acquired is "Japan", where the harmful level information is "2" in the "nude" category, and where the rule is that shown in the table of FIG. 2, the output controller 18 determines that the data is permitted to be outputted. For example, in a case where two country information items, the aforementioned nationality of the owner and the country where the mobile station 10 is located, can be acquired as the output control information, the mobile station may be preferably arranged to apply a stricter rule. Since harmful levels are individually different between two countries, the above-mentioned configuration can avoid failure in satisfying the criteria of either country. Likewise, where the country information and the carrier information both can be acquired, the mobile station may be arranged to apply a stricter rule.

When the output controller 18 determines that "the data is permitted to be outputted", the output controller 18 controls the output part 11 to output the data. The output part 11 thus controlled performs a data output process (S05). When the output controller 18 determines that "the data is prohibited from being outputted", the processing is terminated without output of the data.

Since the present embodiment is arranged to perform the output control of information, based on the output control information acquired, in the light of the predetermined rule suitable for each country and individual circumstances, it is feasible to more adequately perform the output control in the mobile station 10 in accordance with each country and individual circumstances.

Although the present embodiment is arranged to acquire the data as a target for output from site 20, it is also possible to perform the output control over data preliminarily held in the mobile station 10.

The disclosure of Japanese Patent Application No. 2004-085380 filed Mar. 23, 2004 including specification, drawings and claims is incorporated herein by reference in its entirety.

What is claimed is:

1. A mobile communication device having an output for outputting data received over a wireless network from a content provider site, the mobile communication device comprising:

a reader configured to read information from an external recording medium;

an output control information acquirer configured to acquire carrier information from the information read by the reader, the carrier information used as output control information, the carrier information being information identifying a provider of bi-directional communication services to the mobile communication device;

a harmful level acquirer configured to read harmful level information included in the data received over the wireless network from the content provider site;

an output control rule storage configured to store and make available a predetermined rule to determine whether to output the data based on application of the harmful level information and the output control information to the predetermined rule; and an output controller configured to determine whether to output the received data based on the identified provider of bi-directional communication services and the harmful level information acquired by the harmful level acquirer, as applied to the predetermined rule stored by the output control rule storage;

the output controller further configured to control output of the received data as a result of the determination.

2. The mobile communication device according to claim 1, wherein the output control information acquirer is configured to acquire country information based on either one of the carrier information acquired by the mobile communication device or location information of the mobile communication device measured with a global positioning system.

3. The mobile communication device according to claim 2, wherein the output control information comprises the carrier information and the country information, and wherein the output controller is configured to determine based on a stricter outcome of the predetermined rule whether to output the data according to application of the harmful level information and the carrier information to the predetermined rule, or according to application of the harmful level information and the country information to the predetermined rule.

4. The mobile communication device according to claim 1, wherein the output controller is further configured to deny output of the data in response to absence of the harmful level information in the data received over the wireless network.

5. The mobile communication device according to claim 1, wherein the predetermined rule, with the harmful level information and the output control information applied, is indicative of whether the data violates the laws and regulations of a country where the mobile communication device is currently located.

6. The mobile communication device according to claim 1, wherein the output control information acquirer is configured to acquire a nationality of a user from the information read by the reader, and wherein the output control information comprises the carrier information and the nationality of the user, and wherein the output controller is configured to determine based on a stricter outcome of the predetermined rule whether to output the data according to application of the harmful level information and the carrier information to the predetermined rule, or according to application of the harmful level information and the nationality of the user to the predetermined rule.

7. A method for controlling output of data in a mobile communication device, the method comprising:
the mobile communication device receiving data over a wireless network from a content provider site;
the mobile communication device providing a predetermined rule to determine whether to output the received data based on harmful level information included in the data and output control information;
acquiring carrier information as the output control information with a reader included in the mobile communication device, the reader configured to read information from an external recording medium, the carrier information comprising identification of a company providing mobile communication network services to the mobile communication device;
reading the harmful level information included in the received data; and
determining whether to output the received data based on application of the company providing mobile communication network services and the harmful level information to the predetermined rule; and
controlling the output of the received data as a result of the determination.

8. The method of claim 7, wherein determining whether to output the received data comprises denying output of the received data when the harmful level information is absent from the data received over the wireless network.

9. The method of claim 7, wherein the harmful level information is a predetermined rating of a propriety of a content of the received data, and determining whether to output the received data comprises confirming the received data complies with output restrictions of a country where the mobile communication device is presently located based on application of the company providing mobile communication network services and the harmful level information to the predetermined rule.

10. The method of claim 7, wherein determining whether to output the received data comprises identifying a country from the output control information, and comparing the harmful level information with a propriety of outputting the received data in accordance with criteria for output restrictions of the identified country.

11. The method of claim 7, wherein determining whether to output the received data comprises identifying a restriction of a country where the mobile communication device is currently located, and determining whether to output the received data in accordance with both the restriction of the country and the company providing mobile communication network services.

12. A mobile communication device comprising a user interface configured to output data received over a wireless network, the mobile communication device comprising:
a communication interface configured to receive download data from the wireless network, the download data received from a content provider site included in the wireless network;
a reader configured to read information from an external recording medium;
an output control information acquirer configured to receive the output control information from the information read by the reader, the output control information comprising carrier information identifying a roaming service provider providing communication services to the mobile communication device;
a harmful level acquirer configured to read a content rating included in the download data, the content rating indicative of a predetermined level of propriety assigned to the download data;
an output control rule storage configured to store a predetermined rule; and
an output controller configured to apply the output control information and the content rating to the predetermined rule;
the output controller further configured to determine whether to output the download data to the user interface based on the identified roaming service provider and the content rating applied to the predetermined rule.

13. The mobile communication device of claim 12, wherein the output controller is further configured to output the download data in response to determination that output of the download data to the user interface complies with the laws and regulations of a country determined from the carrier information.

14. The mobile communication device of claim 12, wherein the output control information is indicative of a nationality of a user of the mobile communication device.

15. The mobile communication device of claim 12, wherein the output control information is indicative of a location where the mobile communication device is currently located.

16. The mobile communication device of claim 12, wherein the predetermined rule is set to laws and regulations of a country identified from the carrier information and the content rating to determine if the download data should be output to the user interface.

17. The mobile communication device of claim 12, wherein the predetermined rule prevents violation of laws and regulations of a country identified from the carrier information and output restrictions set by a user of the mobile communication device.

18. The mobile communication device of claim 12, wherein the output controller is further configured to deny output of the download data to the user interface in response to absence of the content rating from the download data.

* * * * *